Aug. 3, 1965    S. P. GEOFFREY ETAL    3,198,578
VEHICLE SEAT
Filed March 11, 1963
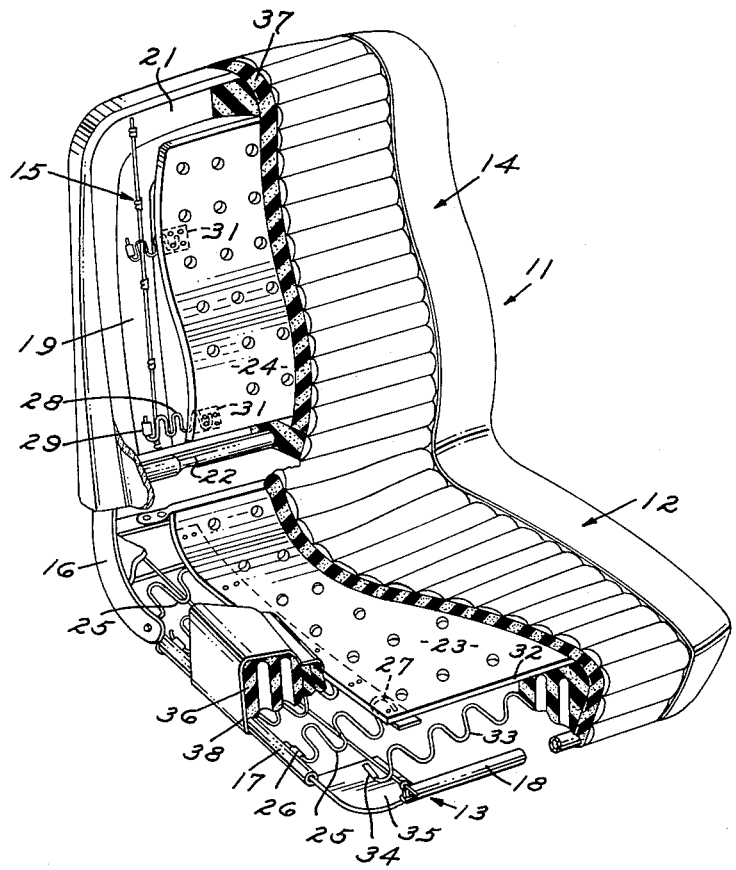
STEPHEN P. GEOFFREY
LEWIS T. HOPPE
INVENTORS
BY John R. Faulkner
John J. Roethel
ATTORNEYS 3,198,578
VEHICLE SEAT
Stephen P. Geoffrey and Lewis T. Hoppe, Dearborn, Mich., assignors to Ford Motor Company, Dearborn, Mich., a corporation of Delaware
Filed Mar. 11, 1963, Ser. No. 264,171
5 Claims. (Cl. 297—456)

This invention relates generally to a seat, and more particularly to a seat for motor vehicles.

The design and construction of a vehicle seat structure represents a comprise of many factors, such as weight, size, ragidity in some elements, flexibility in other elements, durability, occupant comfort and the like. All of these must be blended into a design which fits into and harmonizes with the vehicle package.

In the area of passenger comfort, poor vehicle seat design has a tendency to magnify other faults the vehicle may have. For example, the ride characteristics of the vehicle are ultimately translated to the vehicle occupants through the seats. Properly designed, the seats effectively minimize any ride harshness or vehicle response to road shocks.

Poorly designed seats result also in accelerated driver and passenger fatigue. It is an object of the present invention to provide a vehicle seat structure having improved qualities in the area of reduced driver and passenger fatigue by:

(1) Imparting optimum pressure distribution to the body of the seat occupant; and (2) Maintaining the natural curvature of the spine and thereby effectively reducing backaches due to pinched nerve endings and muscle tension which are inherent in improper spinal curvature.

The object of the present invention is achieved by providing a seat structure having a support section and a back rest section each having a frame formed of structural members. Body contoured buttock and back forms are supported on the respective frames by spring elements which extend between the frames and the forms at the side edges of the latter. The contoured panels are then covered by contoured foam rubber to complete the seat structure.

Other objects and advantages of this invention will be made more apparent as this description proceeds, particularly when considered in connection with the accompanying drawing, which shows an exemplary embodiment of the invention. The view is a perspective view with portions cut away to show the interior structure of the seat.

The drawing illustrates a seat generally designated 11 of the so-called "bucket seat" type now in vogue. The seat 11 includes a seat cushion unit or support section 12 which comprises a frame 13 defining its base perimeter. The seat 11 also includes a back rest unit or section 14 which comprises a frame 15. The frames 13 and 15 are hingedly connected to each other by hinge arms as at 16 so that the back rest 14 may be tilted forwardly over the support section 12. This arrangement is conventional in two door vehicles in which provision is usually made for the back rest sections of the front seat to be tilted forwardly so that the passengers may have access to the rear seats of the passenger compartment. The hinged connections between the two frame structures may be dispensed with when the seat 11 is used as a front seat in a four door vehicle or should it be desired to use a "bucket seat" construction as a rear seat.

The frame 13 of the support section 12 is illustrated as comprising tubular members of which one of the side members 17 and the front or forward member 18 are visible in the drawing. The back rest frame 15 is illustrated as a horse collar sheet metal stamping of which one of the vertical portions 19 and the horizontal top portion 21 appear visible in the drawing. It will be noted that the horse collar is horizontally reinforced across the bottom by a tubular member 22.

The construction of the frames 13 and 15 may take any convenient form. Whatever the form of the frames 13 and 15, it is necessary, however, that they provide suitable platforms for two panel sections 23 and 24, respectively. The panel sections 23 and 24 are contoured, the panel section 23 being a body contoured buttock section and the panel section 24 being a body contoured back rest section.

The panel sections 23 and 24 may be made of any suitable material such as stamped steel, molded plastic or fiberboard.

The panel sections 23 and 24 are supported on the respective frames by short zigzag or formed wire spring elements 25. As shown in the drawing, the spring elements 25 supporting the one side of the panel 23 are attached by retainers 26 to the frame member 17 and to the panel 23 by suitable retainers at 27. It will be understood that the other side of the panel 23 is similarly attached to and supported by spring elements 25 (not shown).

The back rest panel section 24 is supported on spring elements 28 which are attached to retainers 29 secured at one end to the frame member 19 and at the other end to retainers 31 attached to the panel 24. The other side of the panel 24 is similarly supported.

It will be noted that the forward edge 32 of the support section panel 23 is spaced rearwardly of the forward tubular frame member 18. Interposed between the forward edge 32 of the panel section 23 and the tubular member 18 is a zigzag or formed wire spring element 33 which is fastened at its ends to retainers 34 secured to corner plates 35 attached to the frame members, only the plate 35 attached to the tubular frame member 17 and 18 being visible but it being understood that the other corner is similarly constructed. The function of the spring element 33 is to provide an independently yieldable support immediately below the knee portion of the vehicle seat occupant.

To complete the seat structure, the contoured panels 23 and 24 and the frame sections are covered by contoured foam rubber cushions 36 and 37, respectively, to form the bucket seat appearance. The foam rubber may then be covered with any suitable vinyl or cloth covering 38 to provide the necessary exterior wear surface on the seat.

The formed panel sections 23 and 24 approximate the contour of the body of an average person in a seated position. As a result the pressure exerted on the body in supporting the body in a seated position imparts an optimum pressure distribution to the body. The panel section 24 maintains the natural curvature of the spine. This effectively reduces the likelihood of backaches due to pinched nerve endings and muscle tension which are inherent in improper spinal curvature. Since the panels 23 and 24 in effect float relative to the frame of the seat 11, the panels are substantially isolated from vehicle body vibrations and from road shocks which are transmitted through the vehicle body to the seat frame. Such a seat structure is thus able to minimize any faults in the ride characteristics of the vehicle, particularly such as would be noticed when riding over a rough terrain.

It will be understood that the invention is not to be limited to the exact construction shown and described but that various changes and modifications may be made without departing from the spirit and scope of the invention as defined in the appended claims.

We claim:
1. In a vehicle seat,
a support section and a back rest section each having a frame formed of structural members defining horizontal and vertical support planes, respectively,
buttock and back panel sections contoured to conform to the human anatomy,
formed wire spring elements extending between the frame members and the mutually adjacent edge portions of said panel sections,
said formed wire spring elements resiliently supporting said panel sections on said frames in spaced substantially parallel relationship, respectively, to said support planes,
said panel sections under load being displaced toward the respective horizontal and vertical support planes,
the forward edge of said buttock panel being spaced from the mutually adjacent frame member of said support section,
and a zigzag spring element extending between the parallel members of said support and interposed between said forward edge of the buttock panel and the mutually adjacent frame member of said support section.

2. In a vehicle seat,
a support section and a back rest section each having a frame formed of structural members defining horizontal and vertical support planes, respectively,
buttock and back panel sections contoured to conform to the human anatomy,
zigzag spring elements extending between frame structural members defining the sides of said seat and the mutually adjacent side edge portions of said panel sections,
said spring elements resiliently supporting said panel sections on the respective frames in spaced substantially parallel relationship to said support planes,
said panel sections under load being displaced toward the respective horizontal and vertical support planes,
the forward edge of said buttock panel section being spaced from a mutually adjacent forward frame member of said support section,
and a zigzag spring element extending between the side members of said support section and interposed between said forward edge of the buttock panel and said mutually adjacent forward frame member of said support section to provide independently yieldable support forward of said buttock panel section.

3. In a vehicle seat according to claim 2 in which said frames, contoured panels and spring elements are covered by foam rubber or the like.

4. In a vehicle seat according to claim 2 in which said support section and back rest section are independent frames, and
in which hinge means support said back rest section for swinging movement on said support section.

5. In a vehicle seat according to claim 4 in which said frames, contoured panels and spring elements are covered by foam rubber or the like.

References Cited by the Examiner

UNITED STATES PATENTS

| | | | |
|---|---|---|---|
| 2,722,267 | 11/55 | Liljergren | 267—112 |
| 2,728,382 | 12/55 | Baranski | 297—218 |
| 2,860,691 | 11/58 | Caesar | 297—456 |
| 3,034,829 | 5/62 | Flint | 297—368 |
| 3,049,730 | 8/62 | Wall et al. | 297—455 |
| 3,086,817 | 4/63 | Wilfert | 297—460 |
| 3,088,773 | 5/63 | Horrocks et al. | 297—445 |
| 3,114,575 | 12/63 | Eames et al. | 297—458 |

FRANK B. SHERRY, *Primary Examiner.*